United States Patent [19]

Tang et al.

[11] Patent Number: 5,650,699
[45] Date of Patent: Jul. 22, 1997

[54] REMOTE STARTING CIRCUIT AND METHOD FOR BRUSHLESS DC MOTOR

[75] Inventors: Shi Ming Tang; Sang Woo Lee; Sang Yong Lee, all of Kyonggi-do, Rep. of Korea

[73] Assignee: Samsung Electronics Co., Ltd., Suwon, Rep. of Korea

[21] Appl. No.: 534,171

[22] Filed: Sep. 26, 1995

[30] Foreign Application Priority Data

Aug. 3, 1995 [KR] Rep. of Korea .................. 95-23966

[51] Int. Cl.$^6$ ................................................ H02P 6/20
[52] U.S. Cl. ........................ 318/431; 318/254; 318/277
[58] Field of Search ............................ 318/430, 431, 318/138, 254, 439, 264, 276, 277, 278

[56] References Cited

U.S. PATENT DOCUMENTS

| | | | |
|---|---|---|---|
| 4,743,815 | 5/1988 | Gee et al. | 318/254 |
| 4,835,448 | 5/1989 | Dishner et al. | 318/254 |
| 4,876,491 | 10/1989 | Squires et al. | |
| 5,221,881 | 6/1993 | Cameron | 318/254 |
| 5,254,914 | 10/1993 | Dunfield et al. | |

*Primary Examiner*—Bentsu Ro
*Attorney, Agent, or Firm*—Cushman Darby & Cushman, IP Group of Pillsbury Madison & Sutro LLP

[57] ABSTRACT

A remote starting control circuit for a polyphase motor includes a controller, a zero-crosspoint detector, a power switch, a commutation circuit and a motor drive output circuit. The controller controls an excitation current applied to the motor. When the motor starts normally, it is accelerated in accordance with a detected zero-crosspoint. If the zero-crosspoint detector indicates that the motor has not started under optimal conditions, the controller adjusts a power-OFF interval and an excitation pulse width and re-starts the motor accordingly. Because of the ability to controllably adjust the starting of the motor under various excitation conditions, the motor can be started successfully without such problems as torque dead-point, head sticking and insufficient starting torque.

10 Claims, 3 Drawing Sheets

REMOTE STARTING CIRCUIT AND METHOD FOR BRUSHLESS DC MOTOR

BACKGROUND OF THE INVENTION

A. Field of the Invention

The present invention relates to a start control circuit and method for a brushless DC motor. More particularly, the present invention relates to a start control circuit and method for overcoming disadvantages such as dead point, head-sticking and insufficient initial starting torque, by producing a high starting torque at an initial time and accurately detecting a zero-crosspoint in sensorless brushless permanent magnetic DC motor drive applications.

B. Description of the Prior Art

Conventionally, in sensorless brushless permanent DC motor drive applications, such problems as deadpoint, where torque is zero, head sticking, in which the head of a disk sticks to the surface of the disk due to humidity and the like, low starting torque, and having no information about the position of the rotor, have been major difficulties in starting the motor normally.

Furthermore, start failures and start reliability are important issues in the hard disk drive (HDD) industry. To overcome such conventional difficulties, particularly, that of having no information about the position of the rotor, a technique of using electrical radians to detect the position of the rotor instead of Hall sensors is suggested in U.S. Pat. No. 5,254,914 by John C. Dunfield et al. and issued Oct. 19, 1993 and entitled POSITION DETECTOR FOR BRUSHLESS DC MOTOR.

In U.S. Pat. No. 5,254,914, one uses electrical radians to detect the rotor position instead of Hall sensors. However, there are two questions left unsolved. One is the accuracy of electrical radians in a motor drive IC, especially in a high speed precision DC motor. The other is that even if one can get the rotor position by electrical radians, that does not guarantee a high starting torque or a reliable motor start.

In addition, a technique of using a high-frequency commutation, in which a short current pulse is applied to each power phase of the motor and motor current conducted in response thereto is measured to monitor the position of the rotor, is suggested in U.S. Pat. No. 4,876,491 by John P. Squires et al issued Oct. 24, 1989 and entitled COMMUTATORLESS DC MOTOR FOR HARD DISC SYSTEM.

However, the high frequency commutation technique has a disadvantage in that it may cause reverse rotation of the motor when the high frequency commutation is applied during the motor starting period. Rather, it is preferable to detect a zero-crosspoint after starting the motor at a lower frequency than when the motor speed is in its normal state.

Still there remains a disadvantage in that the motor is slowly and abnormally rotated, since a high starting torque cannot be produced if the initial starting torque of the motor is insufficient, even when the motor is started after the zero-crosspoint is accurately detected.

SUMMARY OF THE INVENTION

Accordingly, the present invention is directed to a brushless DC motor start control circuit and method thereof that substantially obviates one or more of the problems due to limitations and disadvantages of the prior art.

The features and advantages of the invention are set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages, and in accordance with the purpose of the invention, as embodied and broadly described herein, a start control circuit comprises means for turning ON/OFF a power line $V_{DD}$ after receiving a control signal; means for producing a signal for turning ON/OFF a switching element after receiving a control signal and being set/reset; motor means; means composed of the switching element turned ON/OFF by the control signal produced from the signal producing means and for activating the motor means by controlling current flowing in each phase of the motor means; means for detecting a zero-crosspoint of the motor means and producing a signal; means for accelerating rotation speed of the motor means when information about the zero-crosspoint produced from the detecting means is inputted; and means for producing excitation current, controlling ON/OFF operation of the power line turning ON/OFF means and controlling a set/reset operation of the signal producing means, a power-OFF interval and an excitation current pulse width.

The excitation current-producing means includes means for producing excitation current with six or three states; power line turning ON/OFF means for controlling the ON/OFF operation of the means and the set/reset operation of the signal producing means; means for increasing or reducing the power-OFF interval; and means for increasing or reducing the excitation current pulse width.

The excitation current-producing means further includes means for controlling the excitation current-producing means. The means further includes means for connecting an internal circuit to an external micro-processor so that all the operation states can be read/written and all the control operations can be carried out thereby when the microprocessor is applied.

According to another aspect of the present invention, the method for controlling the start control circuit includes the steps of initializing an excitation current pulse width, a variable for checking the number of failures of starting, and a power-OFF time; setting a commutation signal to an initial state; determining whether a zero-crosspoint of the motor means is detected; accelerating the motor means when the zero-crosspoint is detected; modulating the excitation current pulse width when the zero-crosspoint is not detected; activating the motor means by modulating the power-OFF time; determining the number of failures to start the motor means; turning OFF power of the system and suspending the operation when the number of failures of starting the motor means is more than n times; disabling a power line and turning ON the power line when the number of failures of starting the motor means is less than n times; resetting the state of the commutation signal; and returning to the steps of increasing -the variable for checking the failure number of starting and setting the commutation signal to the initial state.

Furthermore, the present invention has an effect of cooling down integrated circuit (IC) temperature by avoiding having high start-circuit flowing through the output stage of the IC.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings illustrate one embodiment of the invention and, together with the description, serve to explain the principles of the invention.

In the drawings.

DESCRIPTION OF THE PREFERRED EMBODIMENT

Reference will now be made in detail to a preferred embodiment of the present invention, an example of which is illustrated in the accompanying drawings. Wherever possible, the same reference numbers are used throughout the drawings to refer to the same or like parts.

Figure 1:
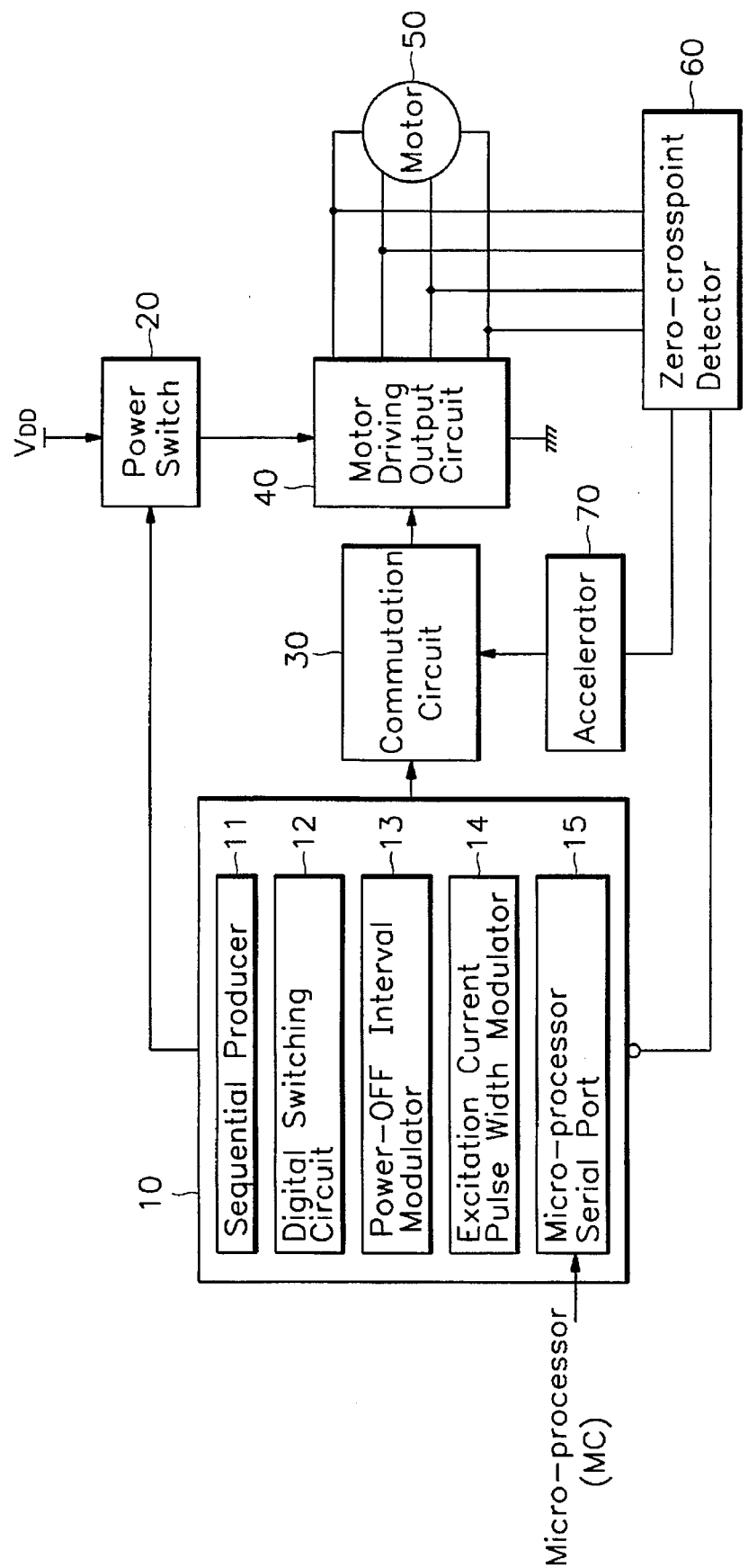
FIG. 1 is a block diagram illustrating a start control circuit in accordance with a preferred embodiment of the present invention.

Referring to FIG. 1, a start circuit comprises a power switch 20 for turning ON/OFF a power line $V_{DD}$ after receiving a control signal, a commutation circuit 30 for producing a signal for turning ON/OFF a switching element after receiving a control signal and being set/reset, a motor 50, a motor-driving output circuit 40 composed of the switching element turned ON/OFF by the control signal produced from the commutation circuit and for activating the motor means by controlling current flowing in each phase of the motor, a zero-crosspoint detector 60 for detecting the zero crosspoint of the motor and producing a signal, an accelerator 70 for accelerating the rotation speed of the motor 50 when 0 information about the zero-crosspoint produced from the zero-crosspoint detector 60 is inputted, and a controller 10 for producing excitation current, controlling ON/OFF operation of the power switch and controlling set/reset operation of the commutation circuit 30, power-OFF interval and excitation current pulse width.

The controller includes a sequential producer 11 for producing excitation current with six or three states, a digital switching circuit 12 for controlling the ON/OFF operation of the power switch 20 and the set/reset operation of the commutation circuit 30, a power-OFF interval modulator 13 for increasing and reducing the power-OFF interval, and an excitation current pulse width modulator 14 for increasing or reducing the excitation current pulse width.

A micro-processor MC controls the sequential producer 11, digital switching circuit 12, a power-OFF interval modulator 13 and the excitation current pulse width modulator 14.

The controller further includes a micro-processor serial port 15 for connecting the internal circuit to external micro-processor MC so that all the operation states can be read/written and all the control operations can be carried out thereby when the micro-processor MC is applied.

The operation of the start control circuit according to the embodiment of the present invention will be explained.

The start control circuit and method is mainly applied to activate a sensorless brushless permanent three-phase DC motor.

The sequential producer 11 in the controller 10 produces excitation current for exciting a coil of the motor 50 when the motor is started.

Referring to FIGS. 2A to 2C and 3A to 3C, the excitation current waveform can be illustrated in two ways. Both these two current waveforms are applicable and suitable for the start control.

Figure 2A:
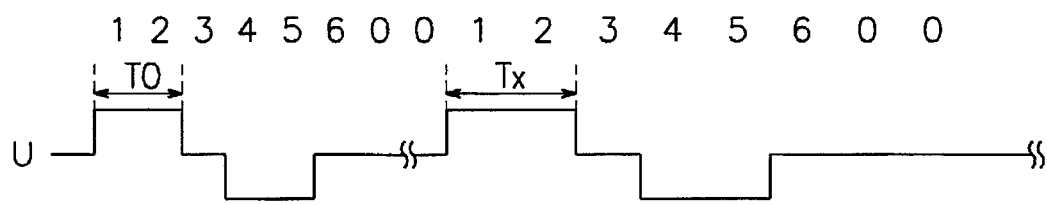
FIGS. 2A to 2C are waveform charts of an excitation current pulse with six states for exciting a start control circuit in accordance with a preferred embodiment of the present invention.
Figure 2B:
Figure 2C:
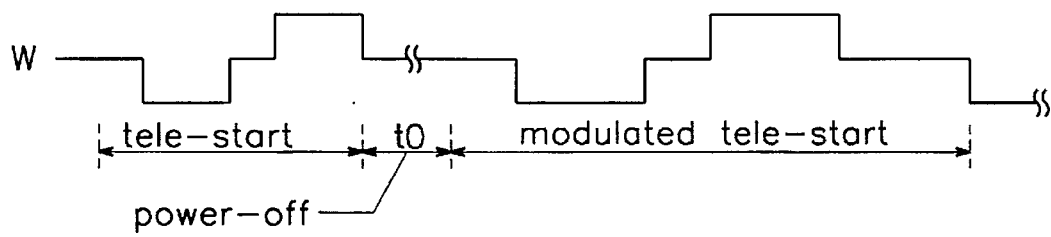

Referring to FIGS. 2A to 2C, the waveform of the excitation current has six states of W, UW, VW, VU, WU and WV. Only two states among the six states are active-high, the others low. In a preferred embodiment, this logic combination can be formed in different ways according to types of electronic power device.

Figure 3A:
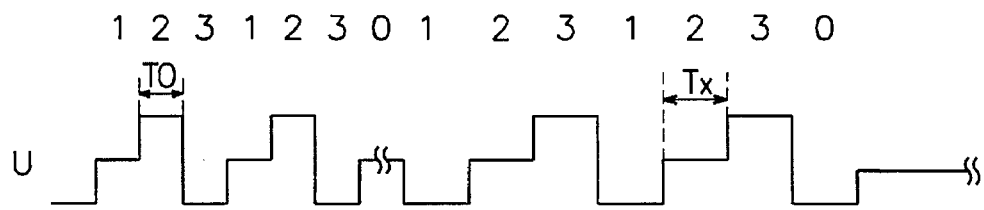
FIGS. 3A to 3C are waveform charts of an excitation current pulse with three states for exciting a start control circuit in accordance with a preferred embodiment of the present invention.
Figure 3B:
Figure 3C:
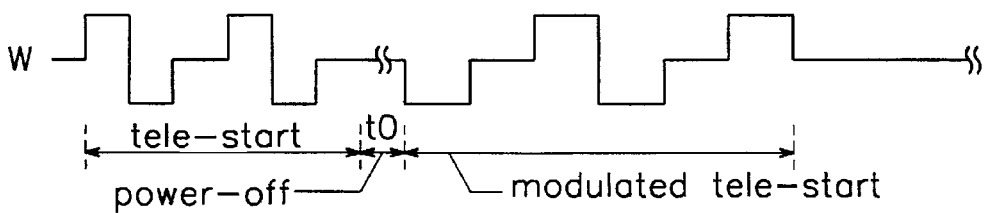

Referring to FIGS. 3A to 3C, the waveform of the excitation current has three states of W, VW, and WU.

Efficiency may be enhanced when the excitation current having six states in FIGS. 2A to 2C is applied to activate the motor and the excitation current having three states in FIGS. 3A to 3C is used to start the motor.

The start control circuit is normally incorporated in the commutation circuit in order to perform more effectively and implement more efficiently. Thus, the excitation process can be operated by the start control circuit and commutation circuit together. However, after successful motor starting, the commutation circuit will work alone while the start control circuit is resting unless a break occurs or power is turned OFF.

In addition, the digital switching circuit 12 in the controller 10 may disable the power line at the moment when the logic signal is inputted by Controlling an ON/OFF operation of the power switch 20 positioned between the power line $V_{DD}$ and the motor driving output circuit.

Once current flows in the coil, induced magnetic flux and reverse electromotive force are produced on each phase of the motor. An initial motor start torque is produced by the magnetic flux produced by a permanent magnet and the induced magnetic flux of the motor. In addition, the reverse electromotive force is source voltage and is proportional to rotation speed.

The above-mentioned factors are the factors which determine the zero-crosspoint of the motor, and the zero-crosspoint is detected by the zero-crosspoint detector 60.

When the motor is normally rotated and the zero-crosspoint is accurately detected, the zero-crosspoint detector 60 produces a logic signal for rotating the motor at high speed to the accelerator 70.

When the motor is not normally rotated, the zero-cross point detector 60 immediately produces a logic signal for disabling the power line to the digital switching circuit 12.

The power-OFF interval depends on electrical and mechanical constants and the load on the motor. The interval is controlled by the start signal, or is programmed to be controlled by a micro-processor when the micro-processor is applied.

As shown in FIGS. 2C and 3C, when the power-OFF interval t0 passes, the excitation current is again applied to the coil of the motor. The new excitation period is shown as the modulated tele-start interval in FIGS. 2C and 3C. When the motor is again started, the excitation current pulse width T and the power-OFF interval t are modulated by increasing or reducing the excitation current pulse width Tx and the power-OFF interval t which were in effect when the motor failed the first time (shown as the tele-start interval), because the excitation current pulse width T0 and the power-OFF interval t0 in effect at the first time of starting the motor may not be optimal conditions.

That is why the power-OFF interval modulator 13 and the excitation current pulse width modulator 14 are provided in the controller 10 to adjust the values to the optimal values.

Figure 4:
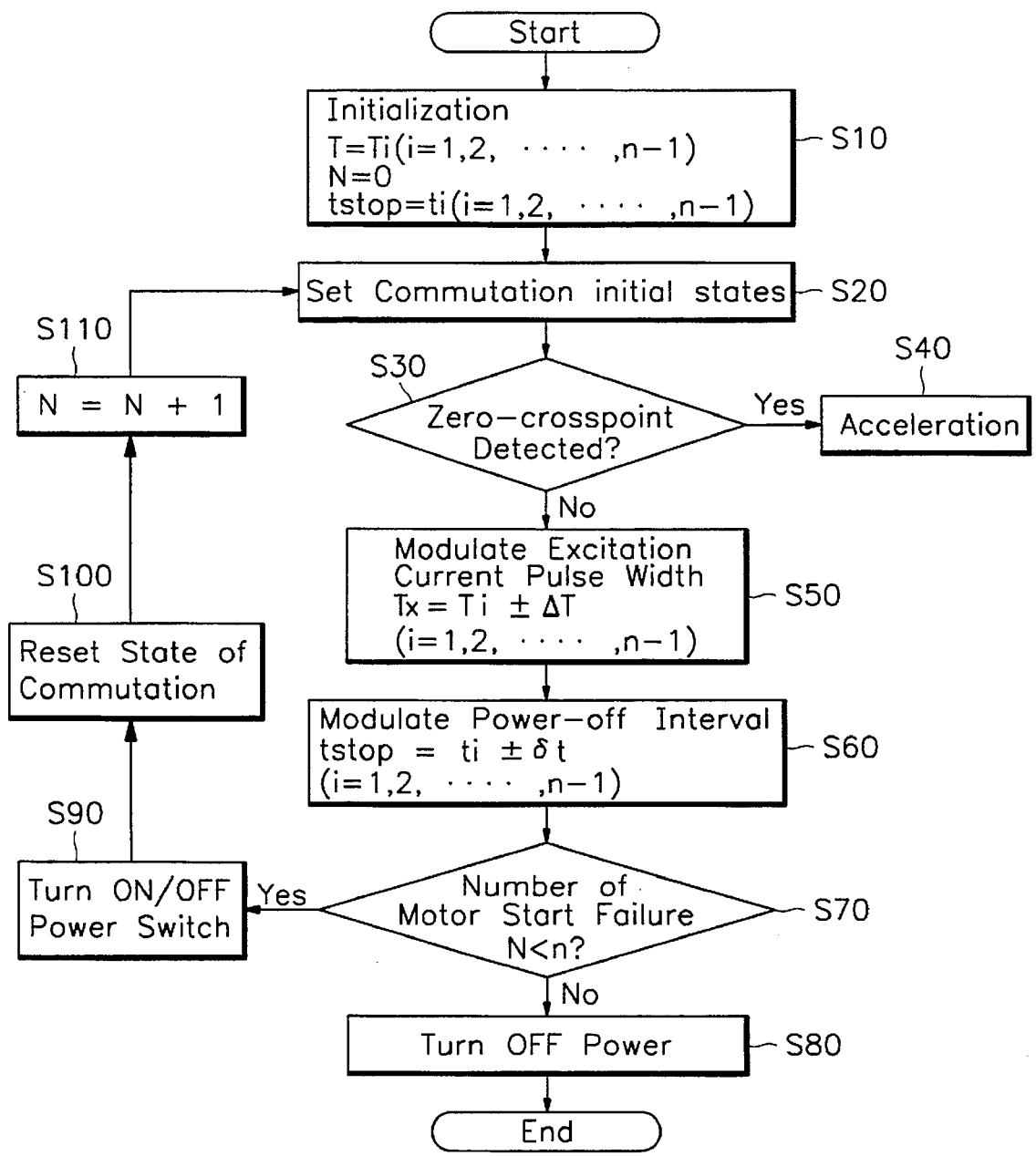
FIG. 4 is a flow chart illustrating the operational steps of a method for controlling a start circuit in accordance with a preferred embodiment of the present invention.

Referring to FIG. 4, a preferred operational flow of the start control circuit, as embodied herein, is described below.

The controller 10 initializes the excitation current pulse width T, a variable N for checking number of failures of starting and the power-OFF interval t, to initial values (Step 10). The controller 10 sets the commutation signal to its initial state (Step 20) and determines whether the zero-crosspoint detector 60 detects the zero-crosspoint of the motor (Step 30), and the accelerator 70 accelerates the speed of the motor (Step 40) after receiving the logic signal from the zero-crosspoint detector 60 when the zero-crosspoint of the motor is detected.

The controller 10 operates to modulate the excitation current pulse width (Step 50) and to start the motor by modulating the power-OFF time (Step 60) when the zero-crosspoint of the motor is not detected.

The controller 10 determines the number of motor start failures (Step 70). When the motor fails more than n times (defined by a user), the power line of the system is disabled and operation is suspended (Step 80). However, when the motor does not fail more than n times, the power line is disabled and immediately enabled (Step 90).

Next, the controller 10 operates to reset the commutation signal to the initial state (Step 100) and to return to the step of increasing the variable for checking the number of failures of starting and setting the commutation signal to the initial state (Step 110).

It is known that, after the power is turned OFF, the saturated magnetic field can recover, and the bias magnetic field can be considered as potential energy stored in motor coils and motor stator. As mentioned before, the energy of the saturated flux density is somehow converted into mechanic energy stored in motor inertia, J. It is noticed that the time interval of power-OFF has significant meaning to the subsequent re-start, because, even after power has been turned OFF, the next re-start is not a zero-start. If the power is next turned ON, the bias magnetic energy and de-saturated magnetic field will play a role as an initial condition of the later current excitation. The force direction of the first excitation is in the opposite direction of the second excitation.

On the other hand, the energy stored as inertia J of the motor when power is turned OFF, shows a tendency of backward position displacement.

The electrical and mechanical potential energy produces an effect of doubling the starting torque in a forward direction when the power is turned ON again. As a result, a higher starting torque than the conventional starting torque is obtained.

This start control can be operated more than once until the motor successfully starts to spin up. Such start control can be programmed by a microprocessor or implemented by a logic circuit. Since this start procedure seems like the old style telegraph operation in terms of the tone of "daa-daa, . . . daa-daa", we call this start method telegraph start or just tele-start.

As described above, in the preferred embodiment of the present invention, a start control circuit and method can overcome disadvantages such as dead-point, head sticking and insufficient initial starting torque, by producing an initial high starting torque in sensorless brushless permanent magnetic DC motor drive applications.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A start control circuit for a motor having a plurality of motor phases comprising:

first means for controlling connection of a power line in accordance with a power line control signal;

second means for producing a switching control signal after receiving a commutation control signal to set or reset between a current state and an initial state of commutation in correspondence with a predetermined one of said motor phases;

third means composed of a switching element that is turned ON/OFF in accordance with said switching control signal produced by said second means, said third means for activating said motor by controlling current flowing in each of said motor phases of said motor;

fourth means for detecting a zero-crosspoint of said motor and for producing a signal indicative thereof;

fifth means for accelerating a rotation speed of said motor in accordance with said signal indicative of said zero-crosspoint produced from said fourth means; and sixth means for producing an excitation current pulse waveform, for producing said power line control signal for controlling said first means, for producing said commutation control signal for controlling a set/reset operation of said second means, and for controlling a power-OFF interval of said power line control signal and an excitation current pulse width.

2. The start control circuit according to claim 1, wherein said sixth means includes:

seventh means for alternatively causing said excitation current pulse waveform to be produced with six or three states;

eighth means for producing said power line control signal and said commutation control signal;

ninth means for adjusting said power-OFF interval of said power line control signal; and tenth means for adjusting said excitation current pulse width of said excitation current pulse waveform.

3. The start control circuit according to claim 2, wherein said sixth means further includes:

eleventh means for controlling said seventh, eighth, ninth and tenth means.

4. The start control circuit according to claim 3, wherein said sixth means further includes:

twelfth means for connecting said sixth means to an external micro-processor so that operation states of said start control circuit are read and control operations of said eleventh means are carried out thereby when said micro-processor is applied.

5. A start control circuit according to claim 1, wherein said sixth means controls said power-OFF interval and said excitation current pulse width in accordance with a number of times said fourth means indicates that said zero-crosspoint has not been detected.

6. A start control circuit according to claim 2, wherein said ninth means adjusts said power-OFF interval in accordance with said signal indicative of said zero-crosspoint produced by said fourth means.

7. A start control circuit according to claim 2, wherein said tenth means adjusts said excitation current pulse width in accordance with said signal indicative of said zero-crosspoint produced by said fourth means.

8. A method for controlling a motor having a plurality of motor phases, comprising the steps of:

(a) initializing an excitation current pulse width, a number of failures of starting said motor, and a power-OFF time, to respective initial values;

(b) setting a commutation signal to an initial state;

(c) determining whether a zero-crosspoint of a motor is detected;

(d) accelerating said motor when said zero-crosspoint is detected;

(e) adjusting said excitation current pulse width and said power-OFF time, and determining that a failure of starting said motor has occurred when said zero-crosspoint is not detected;

(g) turning OFF power and suspending operation of said motor when said number of failures of starting said motor is more than a predetermined number;

(h) turning OFF power in accordance with said power-OFF time, incrementing said number of failures of starting said motor, and resetting a state of said commutation signal when said number of failures of starting said motor is less than said predetermined number.

9. A start control circuit for a motor having a plurality of motor phases, comprising:

a power switch for controlling connection of power in accordance with a power line control signal;

a commutation circuit that generates a switching control signal after receiving a commutation control signal to set or reset between a current state and an initial state of commutation in correspondence with a predetermined one of said motor phases;

a motor driving circuit including a switching element that is turned ON/OFF in accordance with said switching control signal generated by said commutation circuit, said motor driving circuit activating said motor by controlling current flowing in each of said motor phases of said motor;

a zero-crosspoint detector that detects a zero-crosspoint of said motor and produces a signal indicative thereof;

an accelerator that accelerates a rotation speed of said motor in accordance with said signal indicative of said zero-crosspoint produced from said zero-crosspoint detector; and a controller that produces an excitation current pulse waveform, said power line control signal, and said commutation control signal, and that controls a power-OFF interval of said power line control signal and an excitation current pulse width of said excitation current pulse waveform in accordance with a number of times said zero-crosspoint detector indicates that said zero-crosspoint has not been detected.

10. The start control circuit according to claim 9, wherein said controller includes:

a sequential producer that alternates causing said excitation current pulse waveform to be produced with six or three states;

a digital switching circuit that produces said power line control signal and said commutation control signal;

a power-off interval modulator that adjusts said power-OFF interval of said power line control signal in accordance with said signal indicative of said zero-crosspoint; and an excitation current pulse width modulator that adjusts said excitation current pulse width of said excitation current pulse waveform in accordance with said signal indicative of said zero-crosspoint.

* * * * *